United States Patent
Hammer (10) Patent No.: US 7,065,265 B2
(45) Date of Patent: Jun. 20, 2006

(54) FERROMAGNETIC-SEMICONDUCTOR COMPOSITE ISOLATOR AND METHOD

(75) Inventor: Jacob M. Hammer, Annapolis, MD (US)

(73) Assignee: Photodigm, Inc., Richardson, TX (US)

( * ) Notice: Subject to any disclaimer, the term of this patent is extended or adjusted under 35 U.S.C. 154(b) by 434 days.

(21) Appl. No.: 10/435,977

(22) Filed: May 12, 2003

(65) Prior Publication Data
US 2004/0179256 A1    Sep. 16, 2004

Related U.S. Application Data

(60) Provisional application No. 60/451,160, filed on Jul. 7, 2003.

(51) Int. Cl.
*G02B 6/00* (2006.01)
(52) U.S. Cl. .......................... 385/11; 385/14; 385/130; 385/131
(58) Field of Classification Search ................ 385/11, 385/14, 27, 28, 6, 129, 130, 131, 132, 1, 385/2, 3
See application file for complete search history.

(56) References Cited

U.S. PATENT DOCUMENTS

| | | | |
|---|---|---|---|
| 5,598,492 A * | 1/1997 | Hammer | 385/27 |
| 6,208,795 B1 * | 3/2001 | Nakano et al. | 385/131 |
| 6,760,496 B1 * | 7/2004 | Hammer | 385/11 |
| 2003/0175004 A1 * | 9/2003 | Garito et al. | 385/143 |

* cited by examiner

Primary Examiner—Brian M. Healy
(74) Attorney, Agent, or Firm—Duke W. Yee; Robert C. Rolnik (57) ABSTRACT

An exemplary optical isolator, such as a magnetic-semiconductor composite optical isolator, and method for making the same, is provided that includes a semiconductor waveguide and a magnetic-semiconductor composite layer. The semiconductor waveguide includes a guide layer, a first clad layer and a second clad layer. The guide layer includes one or more layers with a first end, a second end, a top, and a bottom, the guide layer allows a light wave incident the first end of the guide layer to propagate in a positive propagation direction, and allows a light wave incident the second end of the guide layer to propagate in a negative propagation direction. The first clad layer and the second clad layer are provided, respectively, relative to the bottom and the top of the guide layer, and the second clad layer has a thickness to allow an optical field penetration through the second clad layer. The magnetic-semiconductor composite layer is provided in the presence of a magnetic field oriented in a desired direction and is positioned relative the second clad layer and at a thickness and index of refraction to receive the optical field penetration through the second clad layer and to attenuate a light wave that propagates in the negative propagation direction more than the attenuation of a light wave that propagates in the positive propagation direction. The magnetic-semiconductor composite optical isolator may be integrated with a semiconductor laser, such as on the same semiconductor substrate.

39 Claims, 4 Drawing Sheets

FERROMAGNETIC-SEMICONDUCTOR COMPOSITE ISOLATOR AND METHOD

CROSS-REFERENCE TO RELATED APPLICATIONS

Pursuant to 35 U.S.C. § 119(e), this application claims the benefit of U.S. Provisional Patent Application Ser. No. 60/451,160, entitled Ferromagnetic-Semiconductor Composite Isolator and Method, filed Jul. 7, 2003, and named Jacob M. Hammer as inventor, which is hereby incorporated by reference for all purposes.

TECHNICAL FIELD OF THE INVENTION

This invention relates in general to the field of semiconductor lasers and optical isolators and more particularly to a ferromagnetic-semiconductor composite optical isolator and method.

BACKGROUND OF THE INVENTION

Optical isolators are used in optical communications systems and optical networks to eliminate or reduce reflected light waves. The presence of reflected light waves in such systems and networks are problematic and may result in significant problems, disadvantages and instabilities, especially when reflected light waves reach or reenter a laser source, such as a semiconductor laser, or optical amplifier.

Conventional optical isolators were developed to eliminate or minimize the presence of reflected light waves. Unfortunately, the manufacture and implementation of conventional optical isolators is complicated, unreliable, expensive and fraught with difficulties and disadvantages.

The implementation of conventional optical isolators is often cumbersome and expensive. For example, conventional optical isolators may use non-reciprocal Transverse Electric ("TE") mode converters and non-reciprocal Transverse Magnetic ("TM") mode converters, reciprocal TE mode converters and reciprocal TM mode converters, an absorption element to absorb modes of light of a particular polarization, and a space periodic magnetic field for quasi-phase match between TE and TM modes. This phase match requirement of conventional optical isolators with their light source, such as a semiconductor laser, is particularly difficult and problematic, and imposes severe fabrication tolerances. For example, the fabrication tolerances on such variables as composition, layer thickness, and interaction length are extremely difficult to consistently achieve and replicate. This causes reliability and performance concerns, along with significantly increased overall costs.

The increased use of semiconductor optical elements and devices, such as semiconductor lasers, laser arrays, and optical amplifiers, has resulted in the need to interface conventional optical isolators with such semiconductor optical elements and devices. This has presented serious challenges and problems. The dramatically different fabrication techniques and materials used in semiconductor optical elements and conventional optical elements and devices has made integration of these optical elements and devices either impossible or impractical.

SUMMARY OF THE INVENTION

From the foregoing it may be appreciated that a need has arisen for a ferromagnetic-semiconductor composite optical isolator and method for use in an optical system or network. In accordance with the present invention, a ferromagnetic-semiconductor composite, or magnetic-semiconductor composite, optical isolator and method are provided that substantially eliminate one or more of the disadvantages and problems outlined above.

According to an aspect of the present invention, a magnetic-semiconductor composite optical isolator, and method for making the same, is provided that includes a semiconductor waveguide and a magnetic-semiconductor composite layer. The semiconductor waveguide includes a guide layer, a first clad layer and a second clad layer. The guide layer includes one or more layers with a first end, a second end, a top, and a bottom, the guide layer allows a light wave incident the first end of the guide layer to propagate from the first end of the guide layer to the second end of the guide layer, which defines a positive propagation direction, and allows a light wave incident the second end of the guide layer to propagate from the second end of the guide layer to the first end of the guide layer, which defines a negative propagation direction. The first clad layer and the second clad layer are provided, respectively, relative to the bottom and the top of the guide layer, and the second clad layer has a thickness to allow an optical field penetration through the second clad layer. The magnetic-semiconductor composite layer is provided in the presence of a magnetic field oriented in a desired direction and is positioned relative the second clad layer and at a thickness and index of refraction to receive the optical field penetration through the second clad layer and to attenuate a light wave that propagates in the portion of the guide layer in the negative propagation direction by an amount greater than the attenuation of a light wave that propagates in the portion of the guide layer in the positive propagation direction.

According to another aspect of the present invention, the magnetic-semiconductor composite optical isolator is integrated with a semiconductor laser, such as a laser diode. The magnetic-semiconductor composite optical isolator may be monolithically integrated or otherwise integrated with the semiconductor laser on the same semiconductor substrate using known or available semiconductor fabrication techniques such as ion implantation, molecular-beam or ion-beam deposition, photolithography, evaporation, diffusion and other semiconductor deposition and fabrication techniques, such as annealing.

Related aspects of the ferromagnetic-semiconductor composite optical isolator of the present invention may include providing the thickness of the magnetic-semiconductor composite layer at an optimal thickness defined by such variables as (i) the thickness where maximum attenuation occurs of a light wave of a known frequency that propagates in the portion of the guide layer in the negative propagation direction, (ii) the thickness where minimum attenuation occurs of a light wave of a known frequency that propagates in the portion of the guide layer in the positive propagation direction, and/or (iii) the thickness where the maximum isolation-to-loss ratio occurs, where the isolation is defined as the attenuation of a light wave of a known frequency that propagates in the portion of the guide layer in the negative propagation direction, and the loss is defined as the attenuation of a light wave of a known frequency that propagates in the portion of the guide layer in the positive propagation direction. Additional related aspects of the present invention may include providing the thickness of the magnetic-semiconductor composite material at a thickness defined by such variables as the thickness that results in a larger optical intensity of the optical field of the light wave of a known frequency that propagates in the portion of the guide layer in the negative propagation direction to penetrate second clad layer to propagate in the magnetic-semiconductor composite material, than the optical intensity of the optical field of the light wave of a known frequency that propagates in the portion of the guide layer in the positive propagation direction to penetrate the second clad layer to propagate in the magnetic-semiconductor composite material.

Other aspects of the magnetic-semiconductor composite optical isolator of the present invention may include a maximum isolation-to-loss ratio that is greater than ten, the magnetic-semiconductor composite layer is made of such materials as (i) ferromagnetic particles such as iron or some other metal such as cobalt in silicon, and (ii) magnetic particles dispersed throughout a semiconductor material, where the magnetic particles are nanometer sized particles.

The various embodiments and implementations of the present invention provide a profusion of potential technical advantages. A technical advantage of the present invention includes the capability to accurately and inexpensively, especially when compared to conventional optical isolators, fabricate and implement a ferromagnetic-semiconductor composite isolator that provides excellent optical isolation properties.

Another technical advantage of the present invention includes the capability to use existing and available manufacturing techniques and processes, including, for example, conventional semiconductor fabrication processes, to fabricate and implement certain embodiments of the invention. This further reduces overall costs to implement and practice the present invention.

Another technical advantage of the present invention includes the capability to reliably and accurately manufacture optical isolators that provide known and predetermined optical isolation properties, while reliably and efficiency interfacing with other semiconductor optical elements, such as semiconductor lasers, optical processors and other conventional optical elements.

Yet another technical advantage of the present invention includes the capability to integrate external optical isolators into existing optical semiconductor devices to provide superior overall device and system performance, reliability, cost, while also reducing overall device and system weight, volume and operational complexity.

Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary designs and implementations illustrated and described herein. For example, although a single layer may be illustrated and described for use in certain aspects of the present invention, it should be understood that the single layer may be implemented as multiple layers in other embodiments of the present invention.

Figure 1:
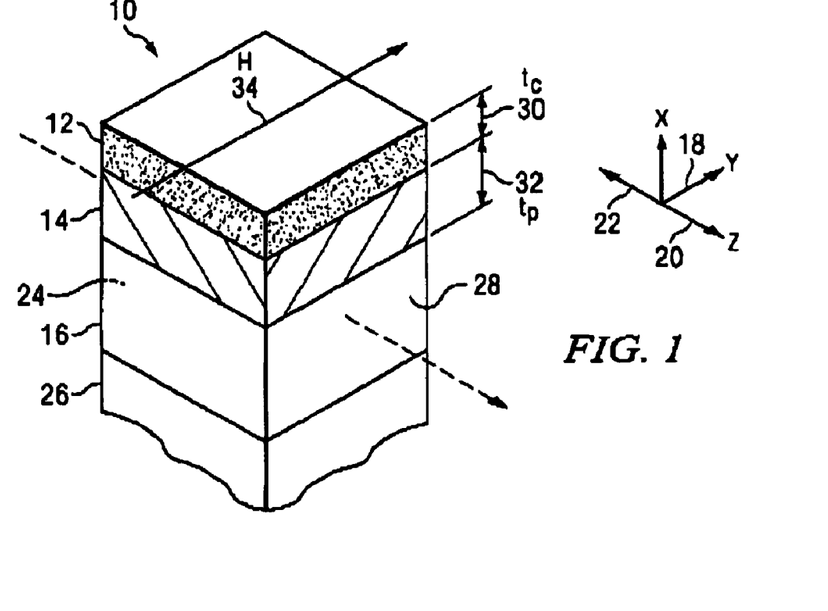
FIG. 1 is a perspective view of a magnetic-semiconductor composite optical isolator that illustrates a plurality of layers fabricated in accordance with an embodiment of the present invention.

FIG. 1 is a perspective view of a magnetic-semiconductor composite optical isolator 10, such as a ferromagnetic-semiconductor composite optical isolator, that illustrates a plurality of layers fabricated in accordance with an embodiment of the present invention. The magnetic-semiconductor composite optical isolator 10 includes a first clad layer 26 (which in some embodiments may be implemented as a semiconductor substrate), a guide layer 16, which may also be referred to as a core and which may include multiple layers such as high refractive index layers, a second clad layer 14, and a ferromagnetic-semiconductor composite ("FC") layer 12, such as a magnetic-semiconductor composite layer or a ferromagnetic-particle-semiconductor composite, provided in the presence of a magnetic field, such as a static magnetic field 34 oriented as shown along a positive y axis 18, which may also be referred to as the H(+) direction. The negative y axis, which is not expressly referenced in FIG. 1, may be referred to as the H(−) direction. The combination of the first clad layer 26, the second clad layer 14, and the guide layer 16 serves as a waveguide to allow light to propagate through the guide layer 16, which is implemented in a semiconductor material, such as a quantum well laser waveguide, a junction, LOC, etc. The combination of the effects of the FC layer 12, which is provided at a desired thickness and having ferromagnetic particles of a desired size and distribution implanted or positioned into the semiconductor material, and the static magnetic field 34, as they act on light waves propagating in the guide layer 16 through the second clad layer 14, which is provided at a desired thickness and length (or range), provide the desired optical isolation with the desired properties as provided by the present invention. The second clad layer 14 may be implemented as a p-clad layers and may also be referred to or implemented as a semiconductor cap or cover layer of a semiconductor optical waveguide structure.

In one embodiment, the magnetic-semiconductor composite optical isolator 10 may be provided with or integrated with a semiconductor laser, such as monolithically integrated on or through a common substrate, such as the first clad layer 26. In other embodiments, the magnetic-semiconductor composite optical isolator 10 may be integrated with other semiconductor optical or electronic devices on a common substrate, or as part of an optoelectronic semiconductor circuit.

Figure 2:
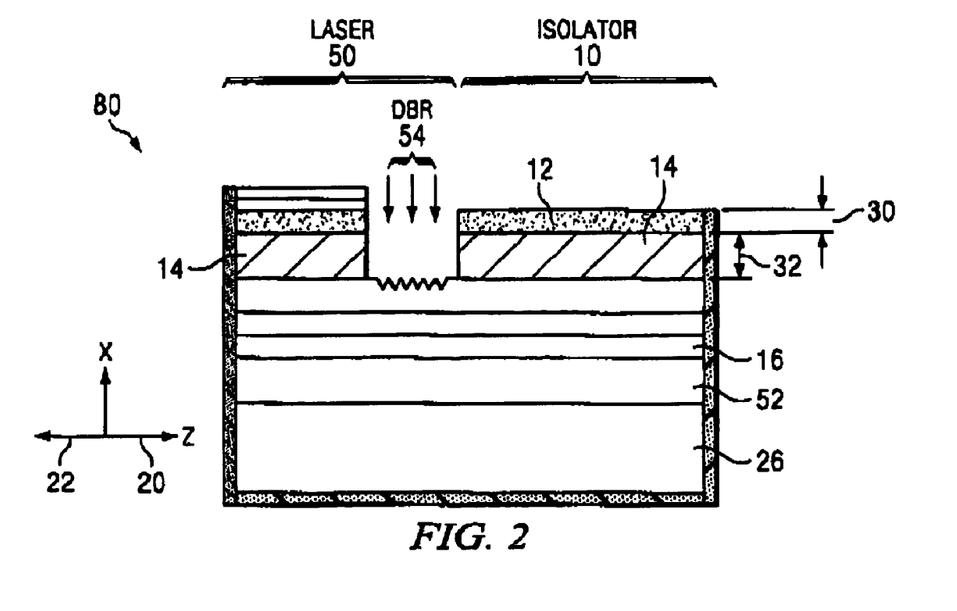
FIG. 2 is a side view of an integrated optical semiconductor device that includes a semiconductor laser and a magnetic-semiconductor composite optical isolator on a substrate, such as integrated on a common substrate or monolithically integrated on a common substrate, in accordance with another embodiment of the present invention.

The magnetic-semiconductor composite optical isolator 10 may receive a light wave from a laser light source, such as that provided by laser or a semiconductor laser not shown in FIG. 1 but illustrated in FIG. 2, to provide optical isolation to the laser light source, such as the semiconductor laser. For example, a light wave provided from a laser light source may contact the guide layer 16 incident a first end 24 and propagate through the guide layer 16 until the light wave reaches a second end 28. This direction of propagation may be defined as a positive propagation direction along the positive z axis 20 as shown. A light wave, such as a reflected light wave, may contact the guide layer 16 incident the second end 28 and propagate through the guide layer 16 until the light wave reaches the first end 24. This direction of propagation may be defined as a negative propagation direction along the negative z axis 22 as shown. The magnetic-semiconductor composite optical isolator 10, as will be explained below, attenuates the reflected light wave that propagates in the negative propagation direction along the negative z axis 22 to provide the desired optical isolation, while minimally affecting the light wave that propagates in the positive propagation direction along the positive z axis 20.

The FC layer 12 may be implemented and/or fabricated using, in one embodiment, ion implantation or other known or available semiconductor fabrication techniques to ensure that ferromagnetic particles or magnetic particles are dispersed or positioned, such as in island arrangements, as desired in a semiconductor material, such as silicon or GaAs. In one embodiment the magnet particles are nanometer sized iron particles. The FC layer 12 of the magnetic-semiconductor composite optical isolator 10 is provided at a desired position relative to the top of the second clad layer 14, at a desired thickness 30, and at a desired complex index of refraction to produce the needed optical isolation of light waves propagating in the guide layer 16 in the negative propagation direction, as shown as the negative z axis 22. In another embodiment, the FC layer 12 may include one or more layers to constitute the overall desired thickness 30 of the FC layer 12. An optimal or desired thickness 30 of the FC layer 12 may be selected according to an embodiment of the present invention to provide desired optical isolation properties. In still other embodiments, the FC layer 12 may be generated or fabricated through successive applications of layers of ferromagnetic materials that are heat treated to form nanometer sized islands followed by a sputtered or evaporated semiconductor layer. This layer sequence may be repeated until a ferromagnetic-semiconductor composite layer of the desired thickness is obtained. Other methods of deposition known in the art such as evaporation, molecular-beam or ion beam deposition, ion implantation and annealing may also be used. In addition, a ferromagnetic material may be diffused into a semiconductor layer to form a composite of the FC layer 12. Thus, the FC layer 12 may include multiple layers and can be used with most waveguide and integrated optical material systems. The thickness of the second clad layer 14 must be such that the optical field of the light waves propagating through the guide layer 16 can penetrate through the second clad layer 14 and into the FC layer 12.

The FC layer 12, in one embodiment, may be deposited or positioned directly on the second clad layer 14, which may also be a referred to as a thinned clad layer, at a thickness 32. It should be understood that, in other embodiments, the FC layer 12 may be positioned such that another layer or layers are positioned between the FC layer 12 and the second clad layer 14. As mentioned above, the thickness of the second clad layer 14 is determined or designed to allow for the penetration of the optical field of the guided mode of light waves propagating in both the positive and negative propagation directions through the portion of the guide layer 16 extending relative the second clad layer 14 and into the FC layer 12, which is provided in the presence of the magnetic field as indicated by the static magnetic field direction 34. At least a component, and preferably the primary component, of the magnetic field needs to be oriented in a direction that is parallel to the magnetic vector of the optical field and that is perpendicular to the positive propagation direction, such as the positive y axis 18, which is perpendicular to the positive z axis 20. If the orientation or polarity of the magnetic field direction 34 is reversed, the optical isolation properties of the present invention as illustrated would operate in reverse. That is the light waves propagating through the guide layer 16 in the positive propagation direction will be attenuated to provide optical isolation in the opposite direction. The orientation or polarity of the magnetic field direction 34 may also depend on whether the laser light source is a TE like polarization light wave or a TM like polarization light wave. The orientation of the various layer of the magnetic-semiconductor composite optical isolator 10 may also be rotated or oriented differently depending on whether the laser light source is a TM light wave or a TE light wave. Some examples of this are described below in connection with FIGS. 3a through 3c.

One aspect the present invention is directed toward constructing the magnetic-semiconductor composite optical isolator 10 from a variety of materials and determining the range of thickness of the FC layer 12 to produce desired optical isolation properties in the guide layer 16. The thickness of the FC layer 12 is chosen according to the teachings of the present invention, and the FC layer 12 may be readily fabricated by those skilled in the art.

The application of the magnetic field in the lateral direction or along the positive y axis 18 results in non-reciprocal change of the complex propagation constant of the guide mode. The loss for guided light traveling in the guide layer 16 in the positive z axis in the positive propagation direction is different than the loss or attenuation experienced by a light wave traveling in the guide layer 16 in the negative propagation direction along the negative z axis 22.

The FC layer 12, in a preferred embodiment, includes nanometer-sized ferromagnetic particles implanted or positioned in one or more semiconductor material layers. The optical loss of such a composite layer, such as the FC layer 12, containing the same weight of ferromagnetic material as a continuous ferromagnetic layer is reduced while the Faraday rotation remains the same. The composition and thickness of the FC layer 12 or layers are factors in obtaining isolators with useful isolation-to-loss ratios.

For a given composition and choice of waveguide parameters, the required range of the FC layer 12 thickness is determined by certain waveguide cutoff conditions. For an FC layer 12 having a thickness in a given range, the relatively small change in complex refractive index between the positive and negative propagation direction causes the modal field of the waveguide or fiber, such as the guide layer 16, to have a large overlap in the FC layer 12 in one direction and a much smaller overlap in a reverse direction. This results in a large difference in loss between the two directions resulting in a high isolation ratio and a low insertion loss. The optical intensity of the penetration of the optical field through the second clad layer 14 and into the FC layer 12 is greater from a light wave propagating through the guide layer 16 in the negative propagation direction than from a light wave propagating through the guide layer 16 in the positive propagation direction. These changes take place when a correctly oriented magnetic field is present. Absent such a field, the overlap and loss do not vary when light wave propagation direction is reversed.

It should be appreciated that the magnetic or ferromagnetic particles may be deposited or positioned in the FC layer 12 by any of a variety of known or available techniques. The FC layer 12 may be used with and integrated with various semiconductor devices, such as semiconductor lasers and optoelectric semiconductor devices and systems. The FC layer 12 is provided at the desired thickness 30 and may be positioned adjacent the second clad layer 14. The second clad layer 14 is provided with the thickness 32, and is provided to allow some optical field penetration of the light wave into the FC layer 12 and from the guide layer 16. The thickness 32 or $t_{p'}$ of the second clad layer 14, in a preferred embodiment would have a value sufficiently large so that the confinement factor, $\Gamma$, of the FC layer 12, which measures the field penetration of the principal guided mode into the FC layer 12, is less than 0.3. The field penetration may be calculated by means well known to those of ordinary skill in the art.

The isolation-to-loss ratio is related to the optical field penetration. The isolation-to-loss ratio is related to the thickness 30 of the FC layer 12 and may depend on the thickness 32 of the second clad layer 14 as well. It should be appreciated that in some aspects the isolation-to-loss ratio may be a significant parameter as the actual value of isolation may be set by choosing the isolator length or the length of the FC layer 12 and second clad layer 14 that corresponds to the guide layer 16. Thus, the optimal or desired thickness of the FC layer 12 may be chosen, for example, based on the maximum isolation, the minimum loss, and/or the maximum isolation-to-loss ratio.

When a magnetic field, such as a static magnetic field or other suitable magnetic field, is applied in the lateral direction, or along the positive y axis 18, the loss and effective index for a TM like waveguide modes propagating in the positive propagation direction along the positive z axis 20 is different than for propagation in the negative propagation direction along the negative z axis 22. A similar effect will be encountered for propagation in a single direction when the magnetic field is reversed. The nonreciprocal change is due to the magnetic Kerr effect.

It will be appreciated that the guide layer 16 may be a more complex structure having a plurality of layers and, in such a guide layer 16, the FC layer 12 may be deposited on a top layer of the guide layer 16. The guide layer 16 may be chosen so that some of the optical field of the waveguide mode penetrates the FC layer 12. That is a portion or layer of the guide layer 16 may, in effect, serve as the second clad layer 14.

In the presence of a properly oriented magnetic field, the FC layer 12 has, depending upon the direction of propagation and the field direction, a varying real part (n) and imaginary part (k) of the complex index of refraction. This variation of the complex index of refraction for the magnetic-semiconductor composite optical isolator 10, specifically the FC layer 12, the second clad layer 14, and the guide layer 16, will have differing fields in the composite depending on the dimensions of the FC layer 12, the second clad layer 14, and the guide layer 16, as well as their optical properties. Since the complex index of refraction of the composite depends on the direction of propagation, the magnetic-semiconductor composite optical isolator 10 may have different field overlap and loss, for the two possible directions of propagation and isolation.

It should be appreciated that the magnetic-semiconductor composite optical isolator 10 of the present invention is not restricted to a planer geometry, although it may more easily be visualized as such. Furthermore, in some aspects, the present invention does not require an amplifying structure or electrodes and is not restricted to only planer semiconductor waveguides. Furthermore, the specific types of magnetic material formed by a composite of nanometer size magnetic material particles positioned or implanted in a semiconductor material with a specified refractive index may be necessary in some aspects of the present invention. For example, to obtain high isolation to loss ratios, the index of refraction of the semiconductor of the FC layer 12 may be equal to or greater than the index of refraction of the second clad layer 14.

In a layer-like optical waveguide, such as the magnetic-semiconductor composite optical isolator 10, the FC layer 12 is applied as a top or upper layer whose distance from the guide layer 16 and thickness 30 may be determined by criteria described herein.

Various example calculations may be made to illustrate certain embodiments and aspects of the present invention. The thickness 32 of the thinned cladding of second clad layer 14 is chosen to allow some penetration of the field of the guide mode into the FC layer 12. The isolation-to-loss ratio depends on the thickness of the one or more layers of the FC layer 12. This present invention teaches how to construct optical isolators from a variety of materials and how to determine the range of the thickness of the FC layer 12 to ensure useful devices having desired properties. When the thickness range of the FC layer 12 is chosen according to the teaching of this invention, the magnetic-semiconductor composite optical isolator 10 can readily be fabricated by present state-of-the-art manufacturing processes.

As mentioned above, the magnetic field 34 applied in the lateral (y) direction results in non-reciprocal change of the complex propagation constant of the guided mode. Thus, the loss for guided light traveling in the direction of the positive z axis 20 is different than the loss in the direction of the negative z axis. This may be contrasted with the "conventional" approach that requires a nonreciprocal TE-TM mode converter section, a reciprocal TE-TM mode converter section, a section which preferentially absorbs modes on one polarization, and a space periodic magnetic field for quasi-phase match between TE and TM modes. The phase match requirement of the conventional approach also imposes severe tolerances on composition, layer thickness, and interaction length that are difficult if not impossible to meet in manufacture. These severe tolerances may explain why there have been no optical waveguide isolators commercially available.

The composition and thickness of the composite layer or layers of the FC layer 12 are factors in obtaining isolators with useful isolation-to-loss ratios. For a given composition and choice of waveguide parameters the required thickness range of the FC layer 12 is determined by certain waveguide cutoff conditions, which will be described below.

For the FC layer 12 with a thickness in the correct range, the relatively small change in complex refractive index between the positive and negative propagation direction causes the modal field of the waveguide to have a large overlap in the FC layer 12 in one direction and much smaller overlap in the reverse direction. This in turn results in a large difference in loss between the two directions resulting in a high isolation ratio and low insertion loss.

An example material that may be used in the FC layer 12 is iron, however, it should be appreciated that a variety of materials and metals may be utilized and are within the scope of the invention. Other ferromagnetic or magnetic materials that provide Faraday rotation and magnetic Kerr effect may be similarly used. Some examples are Ni, Co, also lower loss materials such as Gadolinium Bismuth Iron Oxide, YIG (Yttrium Iron Garnet) and others known in the art.

The use of the FC layer 12 provides the non-reciprocal interaction required by true isolators. The high values of the magneto optic effects, e.g., Faraday rotation-Kerr effect, etc., compete with the high loss characteristic of the ferromagnetic material. The loss can be overcome by the high gain of semiconductor junctions or quantum wells but with severe noise, and pump power penalty. Ferromagnetic films consisting of islands with strongly reduced optical losses without substantial reduction in magnetic properties have been reported, but have optical losses reduced by a factor of thirty. Although these are more encouraging, the loss is still too high for practical use.

The present invention, unlike others, recognizes the importance of the thickness in forming an isolator in a semiconductor device. Indeed, others have taught away from the present invention through such statements as "[t]he optical losses of Fe and Ni FC films demonstrated are too high for integrated optical devices, e.g. optical isolators, since Fe and Ni have high losses." Others may have suggested outcomes, such as using lower loss magnetic materials, but others have not recognized or taught how to select the correct thickness of the FC layer 12 and how this acts to overcome the losses and thus allows the use of the very high Kerr and Faraday effects of the ferromagnetic metals.

The magnetic field, such as the static magnetic field 34, may be provided using available or known techniques. For example, M. Levy et al. describes a thin layer permanent magnet that may be used to provide the static magnetic field 34 in an integrated and compact optical isolator.

To obtain high isolation-to-loss ratios the refractive index of the material in which the ferromagnetic particles of the FC layer 12 are implanted or positioned should equal or be greater than the index of the second clad layer 14 and the guide layer 16. In addition, the thickness 30 of the FC layer 12, in a preferred embodiment, would be in the range taught below and the cladding thickness 32 of the second clad layer 14 may be above a minimum value such that the maximum value of the FC layer 12 confinements factor ($\Gamma$) is less than 0.3.

According to one aspect of the present invention, the lower bound of the thickness 30 of the FC layer 12 may be found by calculating the cutoff thickness ($T_c$) of a planar waveguide consisting of a substrate with a refractive index equal to the refractive index of the second clad layer 14 and a guiding film with a complex refractive index equal to that of the FC layer 12 of the magnetic-semiconductor composite optical isolator 10. The top or cover layer may be air or vacuum with refractive index of 1.0. The cutoff thickness of this simple-asymmetric waveguide is readily found using any of a number of known and available computer programs or algorithms that solve the equation for optical waveguides and are well known in the art. Two cutoff thickness values may sometimes be found that include one ($T_c+$) for the forward direction and one ($T_c-$) for the backward direction. The desired thickness range for isolation in the forward direction has ($T_c-$) as a lower bound and may range up to one and one half (1.5) to two (2) times this value. A similar relation holds for the backward direction but has ($T_c+$) as the lower bound. In the two cases illustrated here ($T_c+$)≈($T_c-$).

Two examples or embodiments of the FC layer 12 are provided below. The first embodiment uses an FC layer 12 with iron particles in GaAs deposited on the p-cladding of the second clad layer 14 of a multi-quantum well laser type structure with layers as listed in Table 1 below for operation at a wavelength of 1.3 μm (nm). At this wavelength, GaAs has a refractive index of 3.45 which is higher than the refractive index of the p-clad of AlInAs of the second clad layer 14, which is 3.231. These values satisfy the need to have the material of the FC layer 12 in which the iron particles are positioned with a refractive index equal to or greater than that of the p-clad of the second clad layer 14. The cutoff thickness for the FC layer 12 is shown in Table 3 below.

At a second clad layer 14 p-clad thickness of $t_p=3.0$ μm and an FC layer 12 thickness $t_c=0.32$, the isolation is 111 dB/cm with insertion loss of only 6.3 dB/cm giving the excellent isolation-to-loss ratio of 17.6 in units of dB/dB in the H(−) direction. In the H(+) direction at $t_c=0.33$ a still excellent isolation-to-loss ratio of 15.2 is obtained.

For this discussion we will use the conservative definition that isolation is the difference in loss for the lowest order modes propagating in opposite directions. Reversing the bias magnetic field 34 is equivalent to reversing the direction of propagation of the light wave. If propagation and the magnetic field 34 are both in the plus directions or both in the minus direction the parameters are labeled with (+). Thus losses L(+) result from bias fields H(+). Referring to this case as the forward direction. If the propagation direction and the magnetic fields have opposite signs the labels H(−), L(−) will be used. Referring to the latter case as the backward direction. The results given below will apply to a planar guide or relatively wide ridge and stripe waveguides.

The isolation-to-loss ratio may be found by calculating the complex refractive index of the guided mode as a function of the waveguide parameters using any of a variety of available computer programs, such as the MODEIG, which is a freeware program that solves the wave equations for multi-layer optical waveguides with complex refractive indexes. The change in the imaginary part of the complex refractive index, k, of the guided mode when the direction of propagation is reversed is a measure of the isolation. The loss α is related to k by the following equation:

$$\alpha = \exp(-2\pi k\, z/\lambda).$$

For z=1 cm Loss in dB/cm=20Log(α)

The complex refractive indexes of the FC layer 12, which results from the applied magnetic field 34, are used as input to the waveguide calculations. The FC layer 12 indexes of refraction are calculated by well-known methods. As mentioned, the FC layer 12 may be fabricated or constructed with iron particles of a particular size, spacing and fill factor in the semiconductor material. The effect of such a construction can be modeled by the fill fraction, q, and the loss reduction factor k. The fill fraction q of the FC layer 12 is the volume ratio of ferromagnetic (or magnetic) particles to the semiconductor material of the FC layer 12 and may be specified or estimated. The fill factor cannot be arbitrarily chosen. There is generally an optimum value for each embodiment, which will generally be found to lie between 0.01 and 0.10. The loss of the ferromagnetic particles is reduced as compared to a bulk ferromagnetic material without reduction in the magnetic properties. The imaginary part, k, of the complex refractive index is reduced by the loss reduction factor in the range 1/30 to 2/30 for nanometer sized (30–50 nm) magnetic particles. The complex refractive indexes which result from the applied magnetic field are used as input to the waveguide calculations. These factors are mentioned below in connection with Table 1 and 2 and can be accounted for in the waveguide equations, which are understood by one of ordinary skill in the art and are discussed more fully in U.S. patent application Ser. No. 10/347,089 filed Jan. 17, 2003, entitled Inline Ferromagnetic-Composite Isolator and Method, and that names Jacob M. Hammer as the inventor.

Figure 4:
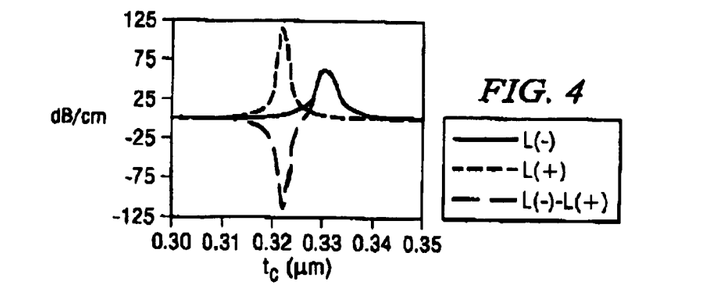
FIG. 4 shows a graph plotting loss in the forward, L(+), and reverse, L(−), directions, and isolation, L(−)–L(+), for p-clad thickness of 3 μm in accordance with an exemplary embodiment of the present invention.
Figure 5:
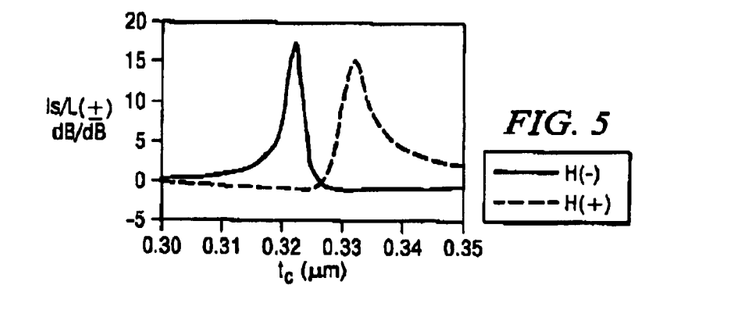
FIG. 5 shows a graph a plot of the isolation-to-loss ratio in the forward, Is/L(+), and reverse, Is/L(−), directions for a p-clad thickness of 3 μm in accordance with an exemplary embodiment of the present invention.
Figure 6:
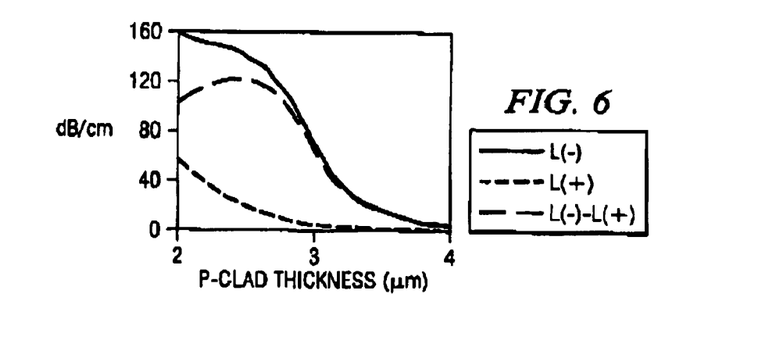
FIG. 6 shows a graph plotting loss in the forward, L(+), and reverse, L(+), directions, and isolation, L(−)–L(+), versus p-clad thickness of for an FC layer thickness, tc, of 0.33 μm in accordance with an exemplary embodiment of the present invention.
Figure 7:
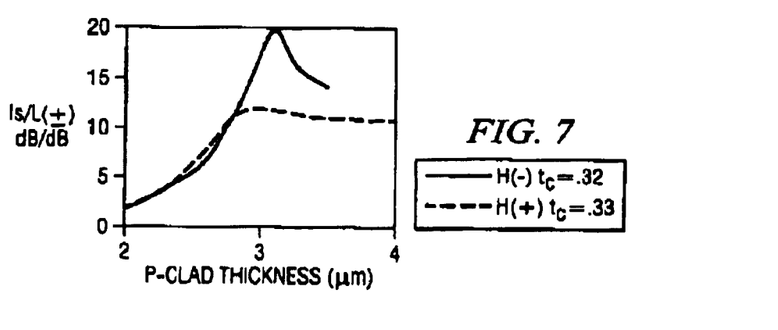
FIG. 7 shows a graph plotting of isolation-to-loss ration in the forward Is/L(+), and reverse, Is/L(−), directions versus p-clad thickness for an FC layer thickness of 0.32 and 0.33 μm in accordance with an exemplary embodiment of the present invention.

The variation of isolation and loss with variation in composite thickness 30 ($t_c$) of the FC layer 12 for the first embodiment are illustrated below in FIG. 4. The long-dashed line gives the isolation in dB/cm which is the difference between the loss in the forward direction shown by the short-dashed line and the backward direction shown by the solid line. The p-clad thickness 32 of the second clad layer 14 in 3.0 μm. In FIG. 5 the isolation ratio is dB/dB for this case with p-clad 25 thickness 32 ($t_p$) of 3.0 μm are plotted against FC layer 12 thickness 30 ($t_c$). The dashed line is for the forward direction labeled H(+) and the solid line is for the backward direction labeled H(−) in FIG. 5. FIG. 6 and FIG. 7 are corresponding plots against p-clad thickness 32 ($t_p$) with the composite thickness 30 ($t_c$) set at an optimum value≈0.32 μm for isolation in the forward direction and the composite thickness 30($t_c$) is set at an optimum value≈0.32 μm for isolation in the backward direction.

In the first embodiment just described, the best isolation-to-loss ratio is found in the backward direction. This means only that in a manufactured optical isolator, the magnetic field direction and the FC layer 12 composite thickness 30 may be chosen to give this performance. It should be remembered that reversing the direction of the magnetic field is equivalent to reversing the direction of flow.

TABLE 1 an optical isolator using Fe—GaAs for the FC layer 12 deposited on a typical MQW structure using quaternary semiconductor layers for operation in the 1.3 μm region This can be fabricated on the same material as a laser or amplifier, and may include a thick p-clad

| Wavelength 1.3 μm Layer Material | Loss | Refractive Index | Thickness μm |
|---|---|---|---|
| Air | 0 | 1.0 | |
| FC layer of Fe—GaAs (H+) k rdtn = 1/30 q = .020 | 1.065E−02 | 3.4496 | See text |
| FC layer of Fe—GaAs (H−) k rdtn = 1/30 q = .020 | 1.470E−02 | 3.4401 | See text |
| p-clad Al InAs | 0 | 3.2310 | See text |
| GRIN | 0 | 3.231–3.304 | 0.02 |
| barrier AlGaInAs | 0 | 3.3728 | 0.02 |
| QW | 0 | 3.485 | 0.005 |
| barrier AlGaInAs | 0 | 3.3728 | 0.01 |
| QW | 0 | 3.485 | 0.005 |
| barrier AlGaInAs | 0 | 3.3728 | 0.01 |
| QW | 0 | 3.485 | 0.005 |
| AlGaInAs | 0 | 3.3728 | 0.01 |
| QW | 0 | 3.485 | 0.005 |
| barrier AlGaInAs | 0 | 3.37282 | 0.02 |
| GRIN | 0 | 3.728–3.231 | 0.08 |
| inner n-clading AlInAs | 0 | 3.2310 | 0.011 |
| GRIN | 0 | 3.231–3199 | 0.01 |
| n-substrate InP | 0 | 3.1987 | | layer for the second clad layer 14 incorporated into the wafer before forming the isolator region. If desired, laser/amplifier regions can be added to the wafer.

The layers listed above in Table 1, or below in Table 2, can be fabricated on the same wafer material as a laser, amplifier or other optoelectronic semiconductor device. A p-clad layer for the second clad layer 14 of the desired thickness can be incorporated into the wafer before forming the isolator region by depositing the FC layer 12. If desired, laser/amplifier regions can be added to the wafer.

The second embodiment of the FC layer 12 for operation at a wavelength λ of 1.55 μm is described next. In this embodiment, the FC layer 12 uses iron particles in silicon deposited on the p-cladding of a multi-quantum well laser structure with layers as listed below in Table 2. The thickness 30 of the FC layer 12 and the minimum thickness 32 of the p-clad layer of the second clad layer 14 is determined as described above. At λ=1.55 μm, silicon had a refractive index of 3.4 and the p-clad of InP has a refractive index=3.163. These values satisfy the need to have the semiconductor material of the FC layer 12 with an index of refraction equal to or greater than the index of refraction of the p-clad layer 14. The cutoff thickness for the FC layer 12 is shown below in Table 3.

TABLE 2

An Isolator using Fe-Silicon FC layer 12 deposited on a typical MQW structure is using quaternary semiconductor layers for operation in the 1.55 μm region. This can be fabricated on the same material as a laser or amplifier. A thick p-clad layer may be incorporated into the wafer before forming the isolator region and, if desired, laser/amplifier regions can be added to the wafer.

| Wavelength 1.55 μm Layer Material | Loss | Refractive Index | Thickness μm |
|---|---|---|---|
| Air | 0 | 1 | |
| FC layer Fe—Si (H+) k rdtn = 1/30 q = .020 | 1.144E-02 | 3.4042 | See text |
| FC layer Fe—Si (H−) k rdtn = 1/30 q = .020 | 1.681E-02 | 3.3930 | See text |
| p-clad InP | 0 | 3.1628 | See text |
| Barrier GaInAsP | 0 | 3.37 | 0.05 |
| QW GaInAsP | 0 | 3.46 | 0.01 |
| Barrier GaInAsP | 0 | 3.37 | 0.01 |
| QW GaInAsP | 0 | 3.46 | 0.01 |
| Barrier GaInAsP | 0 | 3.37 | 0.01 |
| QW GaInAsP | 0 | 3.46 | 0.01 |
| Barrier GaInAsP | 0 | 3.37 | 0.01 |
| QW GaInAsP | 0 | 3.46 | 0.01 |
| Barrier GaInAsP | 0 | 3.37 | 0.05 |
| InP n-clad | 0 | 3.1628 | 0.50 |
| n-InP substrate | 0 | 3.1628 | |

Figure 8:
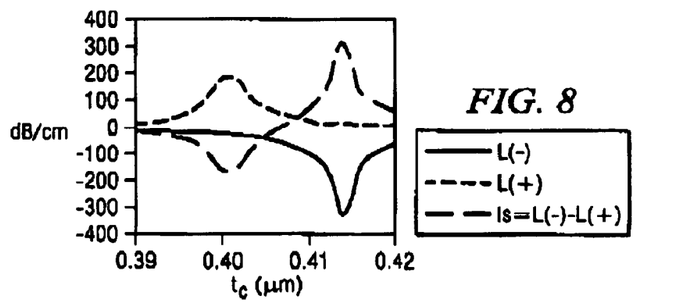
FIG. 8 shows a graph plotting loss in the forward, L(+), and reverse, L(−), directions, and the isolation, L(−)–L(+), for a second clad layer p-clad thickness of 2.3 μm in accordance with an exemplary embodiment of the present invention.
Figure 9:
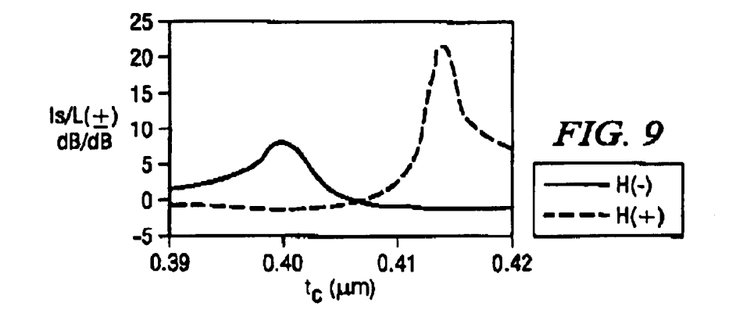
FIG. 9 shows a graph plotting the isolation-to-loss ratio in the forward, Is/L(+), and reverse, Is/L(−), directions, for a second clad layer p-clad thickness of 2.3 μm in accordance with an illustrative embodiment of the present invention.
Figure 10:
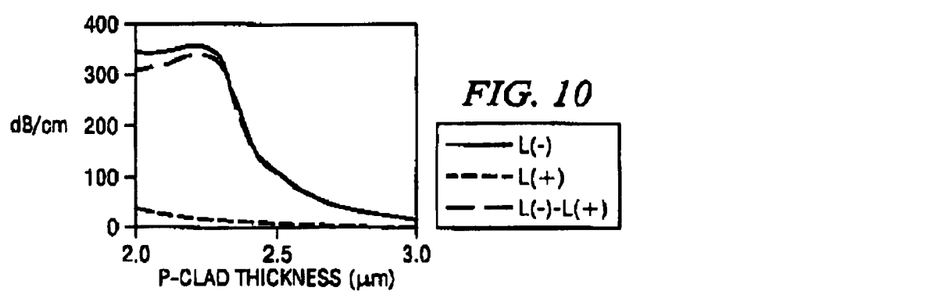
FIG. 10 shows a graph plotting loss in the forward, L(+), and reverse, L(−), directions, and the isolation, L(−)–L(+), versus a second clad layer p-clad thickness for an FC layer of thickness, tc, 0.414 μm in accordance with an illustrative embodiment of the present invention.
Figure 11:
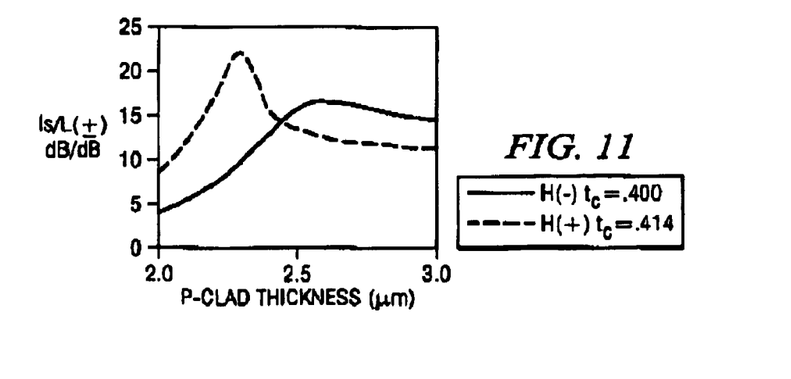
FIG. 11 shows a graph plotting the isolation-to-loss ratio in the forward, L(+), and reverse, L(−), directions versus a p-clad FC layer of thickness, tc, 0.414 μm for H(+) and 0.400 for H(−).

The variation of isolation and loss with variation in composite thickness 30 ($t_c$) for the first embodiment are illustrated below in FIG. 8. The long-dashed line gives the isolation in dB/cm which is the difference between the loss in the forward direction shown by the short-dashed line and the backward direction shown by the solid line. The p-clad thickness is 2.2 μm. In FIG. 9, the isolation-to-loss ratios μm are plotted against the thickness 30 ($t_c$) of the FC layer 12. The dashed line is for the forward direction labeled H(+) and the solid line is for the backward direction labeled H(−). FIG. 10 and FIG. 11 are corresponding plots against p-clad thickness 32 ($t_p$) with $t_c$ set at 0.414 μm for the forward direction and 0.400 μm for the backward direction.

At a p-clad thickness 32 $t_p \approx 3.0$ μm and an FC layer 12 thickness 30 $t_c \approx 0.32$ μm, the isolation s 11 dB/cm with the insertion loss of only 6.3 dB/cm giving the excellent isolation-to-loss ratio of 17.6 in units of dB/dB in the H(−) direction. In the H(+) direction at $t_c \approx 0.33$ μm a still excellent isolation-to-loss ratio of 15.2 is obtained.

A summary of these results and the values of cutoff thicknesses is given in Table 3 below. The calculated FC layer 12 cutoff thickness' ($T_c+$) and ($T_c-$), the value of FC layer 12 thickness' 30 ($t_c+$) and ($t_c-$) for maximum isolation-to-loss ratio and the value of the maximum isolation-to-loss ratio are listed for two FC layer 12 compositions, Fe-GaAs at λ=1.3 μm and Fe—Si at λ=1.55 μm. In both cases the fill factor q=0.02 and the k reduction factor=1/30.

TABLE 3

All lineal dimensions are in μm.

| FC layer 12 Type | Semi-Cond N, λ | p-clad $t_p$ | Cut-off Thckn ($T_c+$) ($T_c-$) | Thckn for Max Ratio ($t_c+$) ($t_c-$) | Max Iso-Loss Ratio (dB/dB) Is/L(+) Is/L(−) |
|---|---|---|---|---|---|
| First Embodiment Fe—GaAs | 3.45, 1.3 | 3.231 3.0 | 0.25 0.25 | 0.33 0.32 | 15.2.0 17.6 |
| Second Embodiment Fe—Si | 3.4, 1.55 | 3.163 2.3 | 0.22 0.22 | 0.41 .40 | 21.8 8.6 |

Looking at FIG. 4 through FIG. 11, it may thus be appreciated how important it is to use the correct range of FC layer 12 thickness 30 ($t_c$) arid ensure that the second clad layer 14 thickness 32 ($t_p$) be above a minimum value. At the same time it may also be appreciated that the actual value of $t_c$ in the desired range is not critical. This eases manufacturing tolerances and makes the approach of this invention practical.

It should again be noted that isolation in the minus direction may also be found. That is, at a second range of $T_c$ values as discussed above there is more loss in the forward direction than in the reverse direction. Both directions combinations should be checked for any desired FC layer 12-guide layer 16 combination and the superior of the two chosen for optimum isolator performance. As taught by this invention, the required thickness 30 ($t_c$) for isolation in the positive direction will be different than that for the negative direction and both may be found from the cutoff thickness' as described earlier. Alternatively the cutoff thickness' may be measured as known in the art and the measured values used to design the isolator.

Although a particular waveguide film or guide layer 16 was shown as an example, it should be understood that any optical waveguide may be used assuming that guide layer 16 shows a cutoff condition as the thickness 30 of the FC layer 12 is varied and the FC layer 12 is deposited on or relative to the second clad layer 14.

FIG. 2 is a side view of an integrated optical semiconductor device 80 that includes a semiconductor laser 50 and the magnetic-semiconductor composite optical isolator 10 integrated on a substrate, such as integrated on a common substrate or monolithically integrated on a common substrate, in accordance with another embodiment of the present invention. The magnetic-semiconductor composite optical isolator 10 portion of the integrated optical semiconductor device 80 is formed from the same epitaxial structure used for the semiconductor laser 50, which may be a diode laser. The semiconductor laser 50 may use a high-reflect coated cleaved facet and a Distributed Bragg Reflector (DBR) 54 for feedback. The DBR 54 may be chosen to have about 30% reflectivity to allow light generated by the semiconductor laser 50 to flow into the magnetic-semiconductor composite optical isolator 10 portion of the integrated optical semiconductor device 80.

In one embodiment, the FC layer 12 is an InGaAsP layer of thickness (tc) 30 that is grown into the epitaxial structure. In the isolator section of the integrated optical semiconductor device 80, the layers above the FC layer may be removed and the FC layer 12 of thickness may be formed, in one embodiment, by selectively implanting Fe+(or possibly Co+) ions into this layer. The second clad layer 14 may be implemented as an InP layer (called the p-clad) of thickness (tp) 32 that separates the resonant layer from the quantum well, barriers and inner clad regions. The isolation-to-loss ratio of the magnetic-semiconductor composite optical isolator 10 depends strongly on tc and tp, as described above in connection with FIG. 1, along with the thicknesses and indices of the quantum wells, barriers and inner claddings. Because the actual value of isolation may be set by choosing the isolator length, the isolation-to-loss ratio is an important measure of the usefulness of the magnetic-semiconductor composite optical isolator 10.

When a magnetic field (H), such as the static magnetic field 34, is applied in the y direction (into the page and not expressly denoted in FIG. 2) the loss and effective index of refraction for TM like waveguide modes propagating in the +z direction 20 is different than for propagation in the −z direction 22. The same effect will occur for propagation in a single direction when the magnetic field is reversed. This non-reciprocal change is due to the magnetic Kerr effect.

The detailed description of the magnetic-semiconductor composite optical isolator 10 and its operation were made above in connection with FIG. 1. It should be understood that the magnetic-semiconductor composite optical isolator 10 will essentially operate the same when integrated with another semiconductor device, such as the semiconductor laser 50 or any other optical or electrical semiconductor device, such as an optical processor.

The description of the present invention as provided above in connection with FIGS. 1 and 2 is an example of an optical isolator, and supporting calculations, for an optical signal or light wave that is assumed to be an optical signal with a TM polarization mode. The present invention is equally applicable to optical signals with a TE polarization mode. In fact, telecommunications lasers, which are typically used in optical telecommunications networks, generally provide an optical signal with a TE polarization mode. The optical isolators used in such networks must, therefore, be equipped to handle such TE polarization mode optical signals. One of ordinary skill in the art would recognize that the optical isolation calculations described above for handling TM polarization mode optical signals could be adapted for TE polarization mode optical signals through a simple direction or plane transformation. Similarly, structures, such as one or more FC layers, rotated ninety degrees through a plane transformation may be used according to the present invention. Examples of such magnetic-semiconductor optical isolators are illustrated in FIGS. 3a–3c.

Figure 3A:
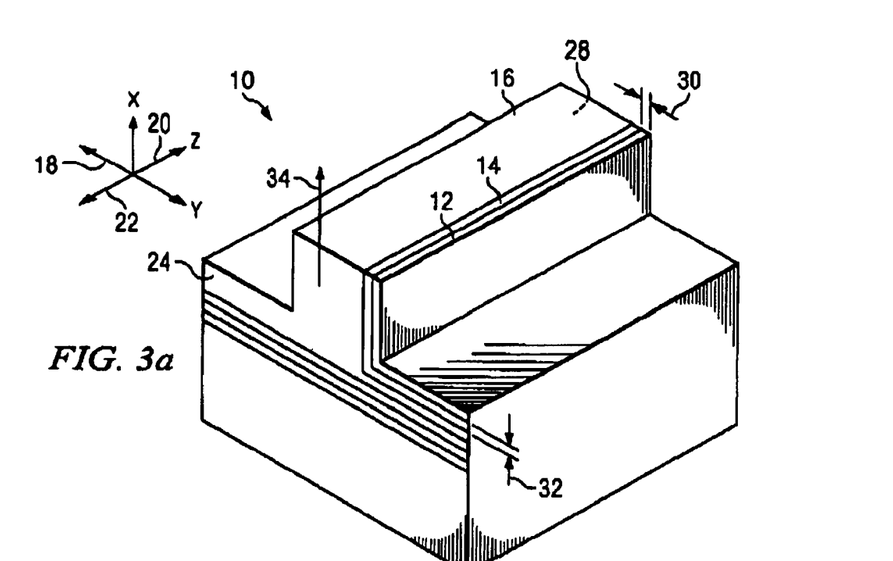
FIGS. 3a–3c are perspective views of various embodiments of a magnetic-semiconductor composite optical isolator that may be used with or integrated with a lights source, such as a semiconductor laser, and that illustrate that the present invention may be used in connection with any of a variety of light waves or optical signal, such as a TM like polarization light wave or a TE like polarization light wave generated by a telecommunications semiconductor laser laser.
Figures 3B, 3C:
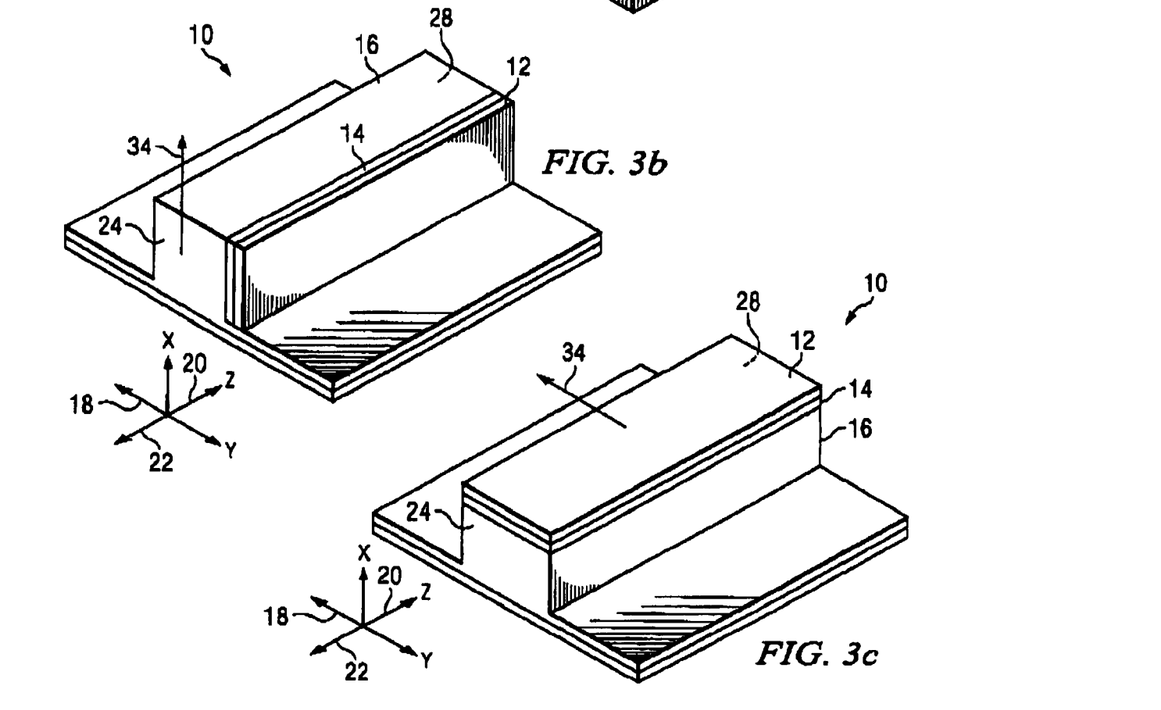

FIGS. 3a–3c are perspective views of various embodiments of the magnetic-semiconductor composite optical isolator 10 that may be used with or integrated with a light source, such as a semiconductor laser. Various embodiments of the magnetic-semiconductor composite optical isolator 10 are illustrated, such as those implemented using a semiconductor ridge, and it should be understood that the present invention encompasses magnetic-semiconductor composite optical isolators that are designed either to integrate with or receive a light wave from any of a variety of light sources, such as those that generate a TM like polarization mode optical signal, or, for example, a TE like polarization mode optical signal.

It should also be understood that the calculations described above in connection with FIGS. 1 and 2 assume a planer structure, but such calculations may be adapted to a circular or other geometrically shaped structural arrangement of the magnetic-semiconductor composite optical isolator of the present invention. The optical signal or light wave that is received by and propagates through the magnetic-semiconductor composite optical isolator 10 may be, for example, an $HE_{11}$ mode optical signal, a TM polarization mode optical signal, or, for example, a TE polarization mode optical signal. The various common elements of the magnetic-semiconductor composite optical isolator 10 between FIGS. 1, 2, 3a, 3b, and 3c are illustrated using the same reference numerals as well as the reoriented axes and corresponding reference numerals.

FIG. 3a is an embodiment of the magnetic-semiconductor composite optical isolator 10 implemented using a semiconductor ridge and designed to receive a TE like polarization mode optical signal. The magnetic-semiconductor composite optical isolator 10 is similar to that described in detail in connection with FIGS. 1 and 2 except that the active layers have been rotated 90 degrees as illustrated. The guide layer 16 is shown as the main ridge in FIG. 3a, with the second clad layer 14 positioned next to the guide layer 16, and the FC layer 12 is shown positioned next to the second clad layer 14. As such, the optical signal or light wave would be received at the guide layer 16 incident the first end 24 and directed along the positive z axis 20 to the second end 28. Because of the differences between a TE like polarization mode optical signal and the TM like polarization mode optical signal illustrated in connection with FIG. 1, magnetic field 34 is directed along the positive x axis as shown. The remaining layers may be any of a variety of semiconductor layers.

The thickness 30 ($t_c$) of the FC layer 12 and the thickness 32 ($t_p$) of the second clad layer 14 of the magnetic-semiconductor composite optical isolator 10 are also illustrated in FIG. 3a. These thicknesses may be calculated as described herein and as understood by one of ordinary skill in the art when dealing with a TE like polarization mode optical signal instead of the TM like polarization mode optical signal illustrated in connection with FIG. 1.

FIG. 3b is similar to FIG. 3a, with a few fabrication differences, and illustrates another embodiment of the magnetic-semiconductor composite optical isolator 10 implemented using a semiconductor ridge and layers in a horizontal stacked arrangement. The magnetic-semiconductor composite optical isolator 10 is also designed to receive a TE like polarization mode optical signal like that of FIG. 3b.

FIG. 3c is an embodiment of the magnetic-semiconductor composite optical isolator 10 implemented using a semiconductor ridge in a vertical stacked arrangement and designed to receive a TM like polarization mode optical signal, similar to what is described above in connection with FIGS. 1 and 2. The component of the magnetic field 34 is oriented in the y direction 18, as it was in FIG. 1.

Thus, it is apparent that there has been provided, in accordance with the present invention, a ferromagnetic-semiconductor composite isolator and method that provides improved performance and that satisfies one or more of the advantages set forth above. Although the preferred embodiment has been described in detail, it should be understood that various changes, substitutions, and alterations can be made herein without departing from the scope of the present invention, even if all of the advantages identified above are not present. For example, the present invention may be used with various types of optical signals. One of ordinary skill in the art would recognize that the optical isolation calculations described herein for handling TM polarization mode optical signals could be adapted for TE polarization mode optical signals through a simple direction or plane transformation. Similarly, structures, such as one or more FPC layers, rotated ninety degrees through a plane transformation may be used according to the present invention.

Also, the techniques, systems, sub-systems, layers, compositions and methods described and illustrated in the preferred embodiment as discrete or separate may be combined or integrated with other systems, modules, techniques, or methods without departing from the scope of the present invention. For example, the clad layer, the guide layer and the magnetic-composite semiconductor layer, in certain embodiments of the present invention, may be implemented using multiple layers of each without departing from the present invention. Further, each such layer or sub-layer within each layer defined herein may be made of the same or different materials with different electrical, magnetic, and optical properties and still fall within the scope of the present invention. In another example, intermediate layers may be positioned between the layers described herein without departing from the scope of the present invention. Other examples of changes, substitutions, and alterations are readily ascertainable by one skilled in the art and could be made without departing from the spirit and scope of the present invention.

What is claimed is:

1. A magnetic-semiconductor composite optical isolator comprising:
   a semiconductor waveguide that includes:
      a guide layer having one or more layers with a first end, a second end, a top, and a bottom, the guide layer operable to allow high wave incident the first end of the guide layer to propagate from the first end of the guide layer to the second end of the guide layer, which defines a positive propagation direction, and operable to allow a light wave incident the second end of the guide layer to propagate from the second end of the guide layer to the first end of the guide layer, which defines a negative propagation direction,
      a first clad layer provided relative the bottom of the guide layer, and
      a second clad layer provided relative the top of the guide layer, wherein the second clad layer has a thickness operable to allow an optical field penetration through the second clad layer by a light wave that propagates in the positive propagation direction of the guide layer, and operable to allow an optical field penetration through the second clad layer by a light wave that propagates in the negative propagation direction of the guide layer; and
   a magnetic-semiconductor composite layer provided in the presence of a magnetic field with at least a component of the magnetic field oriented in a direction perpendicular to the positive propagation direction of the guide layer and parallel to the magnetic vector of the optical field, the magnetic-semiconductor composite layer positioned relative the second clad layer of the waveguide to receive the optical field penetration through the second clad layer, the magnetic-semiconductor composite layer having a thickness and an index of refraction to attenuate a light wave that propagates in the portion of the guide layer in the negative propagation direction by an amount greater than the attenuation of a light wave that propagates in the portion of the guide layer in the positive propagation direction, wherein the magnetic-semiconductor composite layer includes magnetic particles positioned within a semiconductor layer.

2. The magnetic-semiconductor composite optical isolator of claim 1, wherein the thickness of the magnetic-semiconductor composite layer is an optimal thickness defined as the thickness of the magnetic-semiconductor composite layer where maximum attenuation occurs of a light wave of a known frequency that propagates in the portion of the guide layer in the negative propagation direction.

3. The magnetic-semiconductor composite optical isolator of claim 1, wherein the thickness of the magnetic-semiconductor composite layer is an optimal thickness defined as the thickness of the magnetic-semiconductor composite layer where a high isolation-to-loss ratio occurs, where the isolation is defined as the attenuation of a light wave of a known frequency that propagates in the portion of the guide layer in the negative propagation direction, and the loss is defined as the attenuation of a light wave of a known frequency that propagates in the portion of the guide layer in the positive propagation direction.

4. The magnetic-semiconductor composite optical isolator of claim 3, wherein the bit isolation-to-loss ratio is greater than one.

5. The magnetic-semiconductor composite optical isolator of claim 3, wherein the high isolation-to-loss ratio is greater than ten.

6. The magnetic-semiconductor composite optical isolator of claim 1, wherein the magnetic particles are ferromagnetic particles.

7. The magnetic-semiconductor composite optical isolator of claim 6, wherein the ferromagnetic particles are iron.

8. The magnetic-semiconductor composite optical isolator of claim 1, wherein the magnetic particles are metal.

9. The magnetic-semiconductor composite optical isolator of claim 1, wherein the magnetic particles are dispersed throughout the semiconductor layer.

10. The magnetic-semiconductor composite optical isolator of claim 9, wherein the magnetic particles that are dispersed throughout the semiconductor layer are nanometer sized.

11. The magnetic-semiconductor composite optical isolator of claim 1, wherein the magnetic field is a static magnetic field.

12. The magnetic-semiconductor composite optical isolator of claim 1, wherein the light wave is a TE like polarization mode optical signal.

13. The magnetic-semiconductor composite optical isolator of claim 1, wherein the light wave is a TM like polarization mode optical signal.

14. The magnetic-semiconductor composite optical isolator of claim 1, wherein the second clad layer is provided as part of the guide layer.

15. The magnetic-semiconductor composite optical isolator of claim 1, wherein the magnetic-semiconductor composite layer is comprised of more than one layer of magnetic-semiconductor composite material.

16. The magnetic-semiconductor composite optical isolator of claim 1, wherein the second clad layer is provided relative the top of the guide layer along a length, the length defined as at least the minimum distance necessary to ensure that a light wave that propagates in the portion of the guide layer in the negative propagation direction is attenuated by an amount greater than the attenuation of a light wave that propagates in the portion of the guide layer in the positive propagation direction.

17. The magnetic-semiconductor composite optical isolator of claim 1, wherein the second clad layer is provided directly adjacent the top of the guide layer.

18. The magnetic-semiconductor composite optical isolator of claim 1, wherein the guide layer is comprised of more than one layer.

19. The magnetic-semiconductor composite optical isolator of claim 1, wherein the first clad layer is comprised of more than one layer.

20. The magnetic-semiconductor composite optical isolator of claim 1, wherein the second clad layer is comprised of more than one layer.

21. The magnetic-semiconductor composite optical isolator of claim 1, wherein the magnetic-semiconductor composite optical isolator is integrated on a semiconductor material along with other semiconductor devices.

22. The magnetic-semiconductor composite optical isolator of claim 21, wherein the other semiconductor devices include a semiconductor laser.

23. The magnetic-semiconductor composite optical isolator of claim 1, wherein the semiconductor waveguide is a semiconductor ridge guide.

24. The magnetic-semiconductor composite optical isolator of claim 23, wherein the light wave is a TE like polarization mode light wave, and the guide layer of the semiconductor ridge guide is operable to receive the TE like polarization mode light wave incident the first end of the guide layer.

25. A magnetic-semiconductor composite optical isolator comprising:
   a waveguide that includes:
      a semiconductor guide layer having one or more layers with a first end, a second end a top, and a bottom, the semiconductor guide layer operable to allow a light wave incident the first end of the semiconductor guide layer to propagate from the first end of the semiconductor guide layer to the second end of the semiconductor guide layer, which defines a positive propagation direction, and operable to allow a light wave incident the second end of the semiconductor guide layer to propagate from the second end of the semiconductor guide layer to the first end of the semiconductor guide layer, which defines a negative propagation direction,
      a first clad layer provided relative the bottom of the semiconductor guide layer, and
      a second clad layer provided relative the top of the semiconductor guide layer, wherein the second clad layer has a thickness operable to allow an optical field penetration through the second clad layer by a light wave that propagates in the positive propagation direction of the semiconductor guide layer, and operable to allow an optical field penetration through the second clad layer by a light wave that propagates in the negative propagation direction of the semiconductor guide layer; and
   a magnetic-semiconductor composite layer provided in the presence of a magnetic field with at least a component of the magnetic field oriented in a direction perpendicular to the positive propagation direction of the semiconductor guide layer and parallel to the magnetic vector of the optical field, the magnetic-semiconductor composite layer positioned relative the second clad layer of the waveguide to receive the optical field penetration through the second clad layer, the magnetic-semiconductor composite layer having a thickness and en index of refraction to attenuate a light wave that propagates in the portion of the semiconductor guide layer in the negative propagation direction by an amount greater that the attenuation of a light wave that propagates in the portion of the semiconductor guide layer in the positive propagation direction, wherein the magnetic-semiconductor composite layer includes magnetic particles positioned within a semiconductor layer.

26. The magnetic-semiconductor composite optical isolator of claim 25, wherein the second clad layer is a semiconductor clad layer.

27. The magnetic-semiconductor composite optical isolator of claim 25, wherein the second clad layer and the first clad layer are semiconductor clad layers.

28. A semiconductor laser and optical isolator comprising:
   a magnetic-semiconductor composite optical isolator that includes:
      a semiconductor waveguide that includes:
         a guide layer having a first end, a second end, atop, and a bottom, the guide layer operable to allow a light wave incident the first end of the guide layer to propagate from the first end of the guide layer to the second end of the guide layer, which defines a positive propagation direction, and operable to allow a light wave incident the second end of the guide layer to propagate from the second end of the guide layer to the first end of the guide layer, which defines a negative propagation direction,
         a first clad layer provided relative the bottom of the guide layer, and
         a second clad layer provided relative the top of the guide layer, wherein the second clad layer has a thickness operable to allow an optical field penetration through the second clad layer by alight wave that propagates in the positive propagation direction of the guide layer, and operable to allow an optical field penetration through the second clad layer by a light wave that propagates in the negative propagation direction of the guide layer; and
      a magnetic-semiconductor composite layer provided in the presence of a magnetic field with at least a component of the magnetic field oriented in a direction perpendicular to the positive propagation, direction of the guide layer and parallel to the magnetic vector of the optical field, the magnetic-semiconductor composite layer positioned relative the second clad layer of the waveguide to receive the optical field penetration trough the second clad layer, the magnetic-semiconductor composite layer having a thickness and an index of refraction to attenuate a light wave that propagates, in the portion of the guide layer in the negative propagation direction by an amount greater that the attenuation of a light wave that propagates in the portion of the guide layer in the positive propagation direction, wherein the magnetic-semiconductor composite layer includes magnetic particles positioned within a semiconductor layer; and
   a semiconductor laser operable to generate a light wave and to communicate the light wave incident the first end of the guide layer of the semiconductor waveguide of the magnetic-semiconductor composite optical isolator.

29. The semiconductor laser and optical isolator of claim 28, wherein the semiconductor laser and the magnetic-semiconductor composite optical isolator are integrated through a common substrate.

30. The semiconductor laser and optical isolator of claim 29, wherein the semiconductor laser and the magnetic-semiconductor composite optical isolator are monolithically integrated on a semiconductor substrate.

31. The semiconductor laser and optical isolator of claim 28, wherein the light wave generated by the semiconductor laser is a TE polarized light wave.

32. The semiconductor laser and optical isolator of claim 28, wherein the light wave generated by the semiconductor laser is a TM polarized light wave.

33. The semiconductor laser and optical isolator of claim 28, wherein the guide layer is comprised of more than one layer.

34. The semiconductor laser and optical isolator of claim 28, wherein the first clad layer is comprised of more than one layer.

35. The semiconductor laser and optical isolator of claim 28, wherein the second clad layer is comprised of more than one layer.

36. A method for making a magnetic-semiconductor composite optical isolator, the method comprising:
providing a semiconductor wave guide that includes:
a guide layer having one or more layers with a first end, a second end, a top, and a bottom, the guide layer operable to allow a light wave incident the first end of the guide layer to propagate from the first end of the guide layer to the second end of the guide layer, which defines a positive propagation direction, and operable to allow a light wave incident the second end of the guide layer to propagate from the second end of the guide layer to the first end of the guide layer, which defines a negative propagation direction,
a first clad layer provided relative the bottom of the guide layer, and
a second clad layer provided relative the top of the guide layer, wherein the second clad layer baa thickness operable to allow a optical field penetration through the second clad layer by a light wave that propagates in the positive propagation direction of the guide layer, and operable to allow an optical field penetration through the second clad layer by a light wave that propagates in the negative propagation direction of the guide layer; and
providing a magnetic-semiconductor composite layer provided in the presence of a magnetic field with at least a component of the magnetic field oriented in the direction perpendicular to the positive propagation direction of the guide layer and parallel to the magnetic vector of the optical field, the magnetic-semiconductor composite layer positioned relative the second clad layer of the waveguide to receive the optical field penetration through the second clad layer, the magnetic-semiconductor composite layer having a thickness and an index of refraction to attenuate a light wave that propagates in the portion of the guide layer in the negative propagation direction by an amount greater than the attenuation of a light wave that propagates in the portion of the guide layer in the positive propagation direction, wherein the magnetic-semiconductor composite layer includes magnetic particles positioned within a semiconductor layer.

37. A method for making an integrated semiconductor laser and optical isolator, the method comprising:
providing a magnetic-semiconductor composite optical isolator that includes:
a semi-conductor waveguide that includes:
a guide layer having a first end, a second end, a top, and a bottom, the guide layer operable to allow a light wave incident the first end of the guide layer to propagate from the first end of the guide layer to the second end of the guide layer, which defines a positive propagation direction, and operable to allow a light wave incident the second end of the guide layer to propagate from the second end of the guide layer to the first end of the guide layer, which defines a negative propagation direction,
a first clad layer provided relative the bottom of the guide layer, and
a second clad layer provided relative the top of the guide layer, wherein the second clad layer has a thickness operable to allow an optical field penetration through the second clad layer by a light wave that propagates in the positive propagation direction of the guide layer, and operable to allow an optical field penetration through the second clad layer by a light wave that propagates in the negative propagation direction of the guide layer; and
providing a magnetic-semiconductor composite layer provided in the presence of a magnetic field with at least a component of the magnetic field oriented in a direction perpendicular to the positive propagation direction of the guide layer and parallel to the magnetic vector of the optical field, the magnetic-semiconductor composite layer positioned relative the second clad layer of the waveguide to receive the optical field penetration through the second clad layer, the magnetic-semiconductor composite layer having a thickness and an index of refraction to attenuate a light wave that propagates in the portion of the guide layer in the negative propagation direction by an amount greater than the attenuation of a light wave that propagates in the portion of the guide layer in the positive propagation direction, wherein the magnetic-semiconductor composite layer includes magnetic particles positioned within a semiconductor layer; and
providing a semiconductor laser monolithically integrated with the magnetic-semiconductor composite optical isolator on the same semiconductor substrate, the semiconductor laser operable to generate a light wave and to communicate the light wave incident the first end of the guide layer of the semiconductor waveguide of the magnetic-semiconductor composite optical isolator.

38. The semiconductor laser and optical isolator of claim 25 wherein the semiconductor waveguide is a semiconductor ridge guide.

39. The semiconductor laser and optical isolator of claim 25 wherein the wherein the thickness of the magnetic-semiconductor composite layer is an optimal thickness defined as the thickness of the magnetic-semiconductor composite layer where an isolation-to-loss ratio is greater than one, where the isolation is defined as the attenuation of a light wave oft known frequency that propagates in the portion of the guide layer in the negative propagation direction, and the loss is defined as the attenuation of a light wave of a known frequency that propagates in the portion of the guide layer in the positive propagation direction.

* * * * *

UNITED STATES PATENT AND TRADEMARK OFFICE
CERTIFICATE OF CORRECTION

PATENT NO.        : 7,065,265 B2                                Page 1 of 1
APPLICATION NO. : 10/435977
DATED             : June 20, 2006
INVENTOR(S)       : Hammer It is certified that error appears in the above-identified patent and that said Letters Patent is hereby corrected as shown below:

Col. 4, line 8: after "semiconductor" delete "laser".

Col. 4, line 19: after "reverse" delete "L(+)" and insert --L(-)--.

Col. 4, line 23: after "loss" delete "ration" and insert --ratio--.

Col. 13, line 39: after "32 tp≈" delete "3.0" and insert --2.2--.

Col. 17, line 11: after "allow" delete "high" and insert --light--.

Col. 18, line 2: after "the" delete "bit" and insert --high--.

Col. 19, line 11: after "second end" insert -- , --.

Col. 19, line 65: after "second end," delete "atop" and insert --a top--.

Col. 20, line 13: after "by" delete "alight" and insert --a light--.

Col. 21, line 18: after "clad layer" delete "baa" and insert --has--.

Col. 22, line 50: after "wave" delete "oft" and insert --of a--.

Signed and Sealed this

Twenty-sixth Day of December, 2006

JON W. DUDAS
*Director of the United States Patent and Trademark Office*